Patented June 17, 1941

2,245,576

UNITED STATES PATENT OFFICE 2,245,576

METHOD OF PROTECTING AND PRESERVING FOOD PRODUCTS

Arnold C. Dickinson, Lunenburg, Mass., and Philip Bliss Myers, Scarsdale, N. Y., assignors to Sardik Incorporated, Jersey City, N. J., a corporation of Delaware No Drawing. Application February 11, 1939, Serial No. 255,860

8 Claims. (Cl. 99—166)

The present invention relates to the protection and preservation of foodstuffs, particularly animal products, during storage, shipment and distribution, the objects of the invention being to prevent dehydration and to minimize the growth of bacteria and the formation of mold.

In carrying out our invention we provide the animal product, such as a quarter of beef, a side of lamb or of pork, a ham, or the like, with a protective coating of jelly-like substance which will cover all exposed surfaces of the product and be of such composition that it will not support the growth of mold on the outside, will seal the product hermetically, and will contain an active ingredient toxic to bacteria. Nevertheless the composition of the coating is such that it will be quite harmless to consumers of the product.

The coating material preferably used in carrying out this invention contains water, acid, and a metallic pectinate together with sugar of an appropriate type, or glycerin or other alcohols in place of the sugar, all in the proper proportions which may be varied according to the precise characteristics of the coating desired. These ingredients, when combined and applied in the manner hereinafter set forth, form a continuous and substantially impervious coating for the animal product. If desired or necessary this coating may be given protection from mechanical injury by an outer covering of paper, woven or knitted cloth, or other suitable sheet material.

When the coating has been applied the product may be subjected to the ordinary processes of preservation such as chilling or freezing, and then held at a reduced temperature in storage or in transit without loss of weight by dehydration and without deterioration by the formation of bacteria and mold.

The metallic pectinate which constitutes an important ingredient of the coating consists of substantially pure pectin combined with a suitable metal such as nickel or cobalt in the proportions of about .2% to about 1% of nickel, or cobalt, to the pectin by weight. The desired metallic pectinate may be formed by adding the proper amount of an appropriate salt of nickel or cobalt, such as nickel sulphate or nickel ammonium sulphate or cobalt sulphate to a water dispersion of pectin. In either case the metal will replace one or more of the non-methylated carboxyl groups in the pectin molecule and form a metal pectinate. If desired the metal pectinate may be recovered from the reacting solution by alcohol precipitation or drying. Under appropriate circumstances the reacting solution may itself be used.

In some instances a dry mixture of finely divided pectin and a salt of the appropriate metal, may be used instead of the metallic pectinate, in which case the reaction will take place and the metallic pectinate will be formed when the mixture is added to water in the manner hereinafter described with respect to the pectinate.

Metallic pectinates thus formed have been found to be toxic to bacteria. For example, a nickel pectinate containing .2% of nickel to pectin by weight will markedly retard the growth of bacteria in a culture medium, the toxicity increasing as the percentage of nickel is increased up to about .5% of nickel to pectin, at which point the maximum bactericidal action appears to be reached. However, the percentage of nickel may be increased beyond .5% and up to about 1% without loss of toxicity to bacteria.

Cobalt pectinate appears to be more toxic to bacteria than nickel pectinate, and in a culture medium a cobalt pectinate containing approximately .5% cobalt to pectin by weight appears to destroy all bacteria and render the culture practically sterile.

Other toxic metals may be used, such for example as silver, copper, manganese, zinc or lead in the formation of metallic pectinates, as an ingredient of the coating herein described, but nickel or cobalt are preferred.

While the metallic pectinates above mentioned are toxic to bacteria, they are not toxic when taken internally. This is due to the colloidal character of the pectinate and to the fact that it is stable under conditions existing in the alimentary canal.

The particular metal pectinate selected as an ingredient of the coating herein described will depend upon conditions to be met. In case it is desired to produce a coating having a high bactericidal action a nickel pectinate containing at least .5% nickel to pectin, may be used. If at the same time a coating material of high viscosity is desired the nickel content of the pectin may be increased, because such increase in nickel content increases viscosity. Much the same is true in the case of cobalt should a cobalt pectinate be desired on account of its generally more effective bactericidal action. Having decided upon the particular metal pectinate which is to be used the coating composition may be prepared for application to the surface of the meat product in any suitable manner.

If it is desired to apply the coating by dipping the product into a bath of the coating material, this bath may be made up in the following manner. Two and one-third pounds of 200 grade slow-set metallic pectinate may be dispersed in 100 pounds of water and 233 pounds of sugar dissolved therein. To this dispersion sufficient acid, either lactic, tartaric, citric, or malic, should be added so that the pH is approximately 3.0. The foregoing is an illustration of a composition which will form a jelly of high strength. Obviously, if a different quantity is desired the amounts of the several ingredients may be changed, provided there is no substantial change in proportions. By altering the proportions a jelly of a different strength may be obtained and, generally speaking, the strength of the jelly increases as the amount of pectinate increases and as the percentage of sugar in the jelly increases. Into this mixture before it has set, the meat product which is to be coated may be dipped one or more times depending upon the thickness of the coating desired, and this mixture will form a jelly-like coating upon the meat product when the reaction is complete. This slow-set jelly mixture may also be sprayed upon the product by appropriate spraying apparatus.

The jelly coating may be formed in still another way by preparing two baths and mixing in the first bath the necessary water, sugar and pectin in the proportions given in the above example and placing the acid, dissolved in alcohol, in the second bath. In this example, rapid-set pectinate may be used. Obviously jelly does not form except in the presence of acid and the alcohol does not dissolve the pectin or materially affect the sugar, hence the coating taken over by the meat product from the first bath to the second bath will not be dissolved but will be formed into a jelly by the action of the acid in the second bath. There should be an excess of acid in the alcohol bath so that the pH of the jelly mixture will be 3.0 or lower.

A jelly-like coating with sugar as its principal ingredient is desirable for the reason that it will not support the growth of mold due to the high proportion of sugar in the coating. The example given contemplates the use of cane sugar, but invert sugar may also be used with possible slight changes in the proportions indicated.

Under certain circumstances when an alcohol bath is not used it may be desirable to substitute a polyhydroxy alcohol such as glycerin, in place of the sugar, and a satisfactory jelly-like coating can be formed in that manner. Such a jelly-like composition also has the property that it will not support mold growth because of the presence of alcohol in the final product.

While it appears to be most advantageous to apply a coating to the product which is to be protected, the purpose of this invention may also be accomplished by coating the inside of a container which is placed around the product in intimate contact therewith, or the coated product may even be enclosed in a container lined with bacteria inhibiting material herein described.

It is known that the spoilage of animal products by the action of bacteria during storage and shipment begins upon the surfaces of the product and in the cracks and crevices of the surface. The coating applied in the manner indicated above fills all of the cracks and crevices and covers the entire surface, thus placing the metallic pectinate, be it nickel, cobalt or other appropriate metal, in intimate contact with the surface of the animal product at all points. Inasmuch as these metallic pectinates are toxic to bacteria, the growth of bacteria on the surface of the animal product will be effectively retarded if not entirely prevented. As has been pointed out heretofore, the jelly-like composition is such that it will not support the growth of mold. The jelly-like coating is substantially impervious and will therefore prevent loss of weight through dehydration. These objectives are accomplished without in any way impairing the animal product for human consumption because the metallic pectinates used, although toxic to bacteria, are not toxic when taken internally, and if any of the surface coating should get into the human system there will be no harmful results.

We claim as our invention:

1. The improvement in the art of protecting and preserving food products which consists in applying to the exposed surfaces thereof a jelly-like coating containing as an active ingredient a metal pectinate toxic to bacteria.

2. The improvement in the art of protecting and preserving food products which consists in applying to the exposed surfaces thereof a substantially impervious jelly-like coating incapable of supporting the growth of mold and containing a metal pectinate which is toxic to bacteria.

3. The improvement in the art of protecting and preserving food products which consists in applying to the exposed surfaces thereof a jelly-like coating containing as an active ingredient nickel pectinate in which the nickel is combined with the pectin in the proportions of about two-tenths of one percent to about one percent of nickel to pectin by weight.

4. The improvement in the art of protecting and preserving food products which consists in applying to the exposed surfaces thereof a jelly-like coating containing as an active ingredient nickel pectinate in which the proportion of nickel to pectin is about five-tenths of one percent by weight.

5. The improvement in the art of protecting and preserving food products which consists in applying to the exposed surfaces thereof a jelly-like coating containing cobalt pectinate as an ingredient toxic to bacteria.

6. The improvement in the art of protecting and preserving animal products which consists in forming upon the exposed surfaces thereof a jelly-like coating substantially impervious to air and containing as an ingredient a metal pectinate toxic to bacteria.

7. The improvement in the art of protecting and preserving animal products which consists in applying to the exposed surfaces of said product a jelly forming mixture of water, sugar, acid and a metallic pectinate and forming upon the surfaces of said product a jelly-like coating substantially impervious to air and toxic to bacteria.

8. The improvement in the art of protecting and preserving animal products which consists in applying to the exposed surfaces of said product a jelly forming mixture of water, glycerin, acid and a metallic pectinate and forming upon the surfaces of said product a jelly-like coating substantially impervious to air and toxic to bacteria.

ARNOLD C. DICKINSON.
PHILIP BLISS MYERS.